(12) United States Patent
Jadunandan et al.

(10) Patent No.: US 9,967,753 B1
(45) Date of Patent: May 8, 2018

(54) WIRELESS COMMUNICATION NETWORK ADAPTATION BASED ON COLLABORATIVE DATA ANALYSIS

(71) Applicant: Sprint Communications Company L.P., Overland Park, KS (US)

(72) Inventors: Kevin V. Jadunandan, Palm Bay, FL (US); Seth T. Shelnutt, Winter Park, FL (US); Paul Andrew Shinholster, Jr., Orlando, FL (US); Todd M. Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 129 days.

(21) Appl. No.: 15/139,291

(22) Filed: Apr. 26, 2016

(51) Int. Cl.
| | | |
|---|---|---|
| H04W 4/00 | (2009.01) | |
| H04W 16/20 | (2009.01) | |
| H04W 64/00 | (2009.01) | |
| H04M 7/00 | (2006.01) | |
| H04J 11/00 | (2006.01) | |
| H04B 7/26 | (2006.01) | |
| H03M 13/00 | (2006.01) | |

(52) U.S. Cl.
CPC ....... *H04W 16/20* (2013.01); *H03M 13/6544* (2013.01); *H04B 7/2628* (2013.01); *H04J 11/00* (2013.01); *H04M 7/0084* (2013.01); *H04W 64/00* (2013.01); *H04M 2215/2026* (2013.01)

(58) Field of Classification Search
CPC ...... H04W 16/18; H04W 24/02; H04W 24/08
See application file for complete search history.

(56) References Cited

U.S. PATENT DOCUMENTS

| | | | |
|---|---|---|---|
| 7,236,767 B1 * | 6/2007 | Cankaya ............... | H04W 24/08 455/405 |
| 2011/0151881 A1 * | 6/2011 | Chou .................... | H04W 16/12 455/447 |

* cited by examiner

*Primary Examiner* — Kevin C Harper

(57) ABSTRACT

A method of managing a wireless communication network. The method comprises collecting network performance data from enhanced node Bs (eNBs) by an application executing on a computer system and collecting user equipment (UE) performance data from UEs, where the UE performance data comprises self-location information at the time of a wireless coverage outage experienced by the UEs. The method further comprises, for each eNB, analyzing by the application network performance data associated with the eNB and UE performance data of wireless coverage outages experienced by UEs determined based on their self-location information to have been proximate to the eNB when its wireless coverage outage was experienced, and, based on the analysis of network performance data in combination with UE performance data, taking action to manage the wireless communication network.

20 Claims, 9 Drawing Sheets

WIRELESS COMMUNICATION NETWORK ADAPTATION BASED ON COLLABORATIVE DATA ANALYSIS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A wireless communication system may include a number of base stations (e.g., cellular base stations, Wi-Fi access points, or the like) that radiate to define wireless coverage areas, such as cells and cell sectors, in which user equipment devices (UEs) such as cell phones, tablet computers, tracking devices, embedded wireless modules, and other wirelessly equipped communication devices (whether or not controlled by a human user), can operate. In turn, each base station may be coupled with network infrastructure, including one or more gateways, routers, and switches, that provides connectivity with one or more transport networks, such as the public switched telephone network (PSTN) and/or a packet-switched network such as the Internet for instance. With this arrangement, a UE within coverage of a base station may engage in air interface communication with the base station and may thereby communicate via the base station with various remote network entities or with other UEs.

Depending on the specific underlying technologies and architecture of a given wireless communication network, base stations may take different forms. In a code division multiple access (CDMA) system configured to operate according IS-2000 and IS-856 standards, for example, a base station may include a base transceiver system (BTS) under the control of a base station controller (BSC). In a universal mobile telecommunications system (UMTS) configured to operate according to ITU IMT-2000 standards, the base station is usually referred to as a NodeB, and is usually under the control of a radio network controller (RNC). In a UMTS network configured to operate to Long Term Evolution (LTE) standards, evolved NodeBs (eNodeBs) may communicate directly with one another, while under functional coordination of a mobility management entity (MME). Other base station architectures and operational configurations are possible as well.

Further, a wireless network may operate in accordance with a particular air interface protocol (i.e., radio access technology), with communications from the base stations to UEs defining a downlink or forward link and communications from the UEs to the base stations defining an uplink or reverse link. Examples of existing air interface protocols include, without limitation, wireless wide area network (WWAN) protocols such as Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1xRTT and 1xEV-DO), and Global System for Mobile Communications (GSM), and wireless local area network (WLAN) protocols such as IEEE 802.11 (WIFI), BLUETOOTH, and others. Each protocol may define its own procedures for registration of UEs, initiation of communications, handover or handoff between coverage areas, and other functions related to air interface communication.

SUMMARY

In an embodiment, a method of managing a wireless communication network is disclosed. The method comprises collecting network performance data from enhanced node Bs (eNBs) by an application executing on a computer system and collecting user equipment (UE) performance data from UEs, where the UE performance data comprises self-location information at the time of a wireless coverage outage experienced by the UEs. The method further comprises, for each eNB, analyzing by the application network performance data associated with the eNB and UE performance data of wireless coverage outages experienced by UEs determined based on their self-location information to have been proximate to the eNB when its wireless coverage outage was experienced, and, based on the analysis of network performance data in combination with UE performance data, taking action by the application to manage the wireless communication network.

In another embodiment, a method of managing a wireless communication network is disclosed. The method comprises collecting network performance data from enhanced node Bs (eNBs) by an application executing on a computer system, collecting user equipment (UE) performance data from UEs, where the UE performance data comprises self-location information at the time of a wireless coverage outage experienced by the UEs, and analyzing by the application the collected network performance data and UE performance data to determine statistical norms of wireless coverage provided by the eNBs. The method further comprises identifying by the application a localized opportunity for improving wireless coverage based on the statistical norms of wireless coverage and the UE performance data associated with the localized opportunity and further building out the wireless communication network by adding an eNB to exploit the localized opportunity to improve wireless coverage, whereby a holistic view of the wireless communication network is fed back to improve local portions of the wireless network.

In yet another embodiment, a method of managing a wireless communication network is disclosed. The method comprises collecting network performance data from enhanced node Bs (eNBs) by an application executing on a computer system, collecting user equipment (UE) performance data from UEs, where the UE performance data comprises self-location information at the time of a wireless coverage outage experienced by the UEs, and, for each eNB, analyzing by the application network performance data associated with the eNB and UE performance data of wireless coverage outages experienced by UEs determined based on their self-location information to have been proximate to the eNB when its wireless coverage outage was experienced. The method further comprises receiving a call to customer care from a UE that has experienced a wireless coverage outage in a specific location, based on the analysis of network performance data in combination with UE performance data corroborating the report of wireless coverage outage, and based on the corroboration of the report of wireless coverage outage, taking action to manage the wireless communication network.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
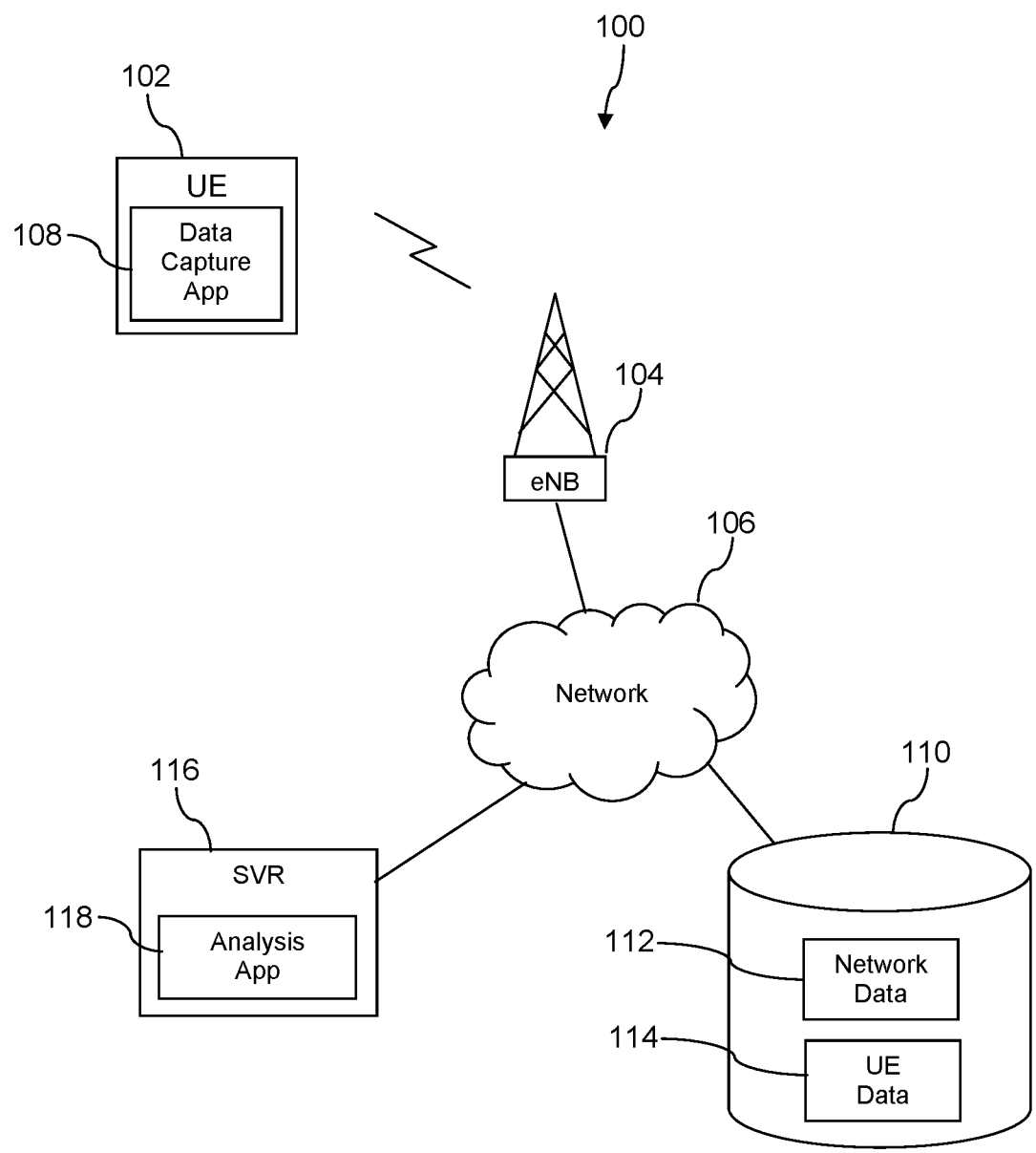
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Radio access networks (RANs) are complex systems. A RAN can be conceptualized as a thin outer shell of a communication network that provides wireless communication links to user equipments (UEs) or mobile communication devices and provides backhaul communication links to a fixed network comprised mostly of fiber optic lines, coaxial cables, copper wire, and electronic devices such as switches, gateways, and routers. A RAN comprises a large number of enhanced node Bs (eNBs) base transceiver stations (BTSs), or cell towers, as well as auxiliary equipment that supports these eNBs such as Internet Protocol (IP) routers, IP aggregators, and the like. In some RANs, tens of thousands of eNBs are deployed.

Each eNB comprises a variety of different equipment items, and different original equipment manufacturers (OEMs) may provide the different equipment items. Different OEMs may provide different categories of equipment items. A variety of sensors located in the eNBs and/or equipment items detect operating conditions and equipment performance indications. These sensors may provide outputs that can be referred to generally as data, as metrics, as performance data, performance metrics, and the like. In some cases, a single category of equipment item in the RAN may be sourced from different OEMs. Different OEMs may provide their own tools for monitoring and managing the equipment items that they have sold to a mobile communication service provider for deploying in their RAN. These different tools may provide different abstractions and hierarchical views of the equipment items and different methods for monitoring and controlling the equipment items. While monitoring and managing the RAN can be a dauntingly complex and difficult task, improved management of the RAN can increase both economic efficiency and customer satisfaction. These different tools may collect or gather the sensor outputs and/or performance data and propagate these to a centralized data store. Alternatively, applications executing on computers may reach out to the eNBs and network equipment to retrieve or collect the sensor outputs and/or performance data, for example by accessing an interface provided by the OEM tools.

The present disclosure teaches a system and method for capturing RAN performance data from different sources, comparing the data from different sources, and making new inferences from those comparisons that can be used to adapt and improve the RAN. This may be referred to as collaborative data analysis in some contexts. More specifically, performance data during lapses of RAN coverage may be captured by user installed applications that execute on the UEs. Sensors on the UEs may detect operating conditions and equipment performance indications of the UE, for example battery energy remaining level, radio transmitter power, received radio signal strength or power level, temperature, and other values. The sensor indications may be referred to generally as UE data, UE metrics, UE performance metrics, and the like. Some of the UE metrics may be produced by digital hardware devices, for example a semiconductor processor (a digital signal processor, an application specific integrated circuit, a microprocessor, a graphics processor, and others). When the UEs reconnect to the RAN—for example when a UE moves out of a radio coverage dead zone such as an elevator shaft in a large building or up from an underground parking garage—the user installed mobile application may transmit the captured performance data to the RAN for backhaul to an analysis server in the wireless service provider network. The analysis server may execute an analysis application that performs the analysis and takes remedial actions as described below. This analysis may be referred to as collaborative data analysis as it is based on data from the RAN as well as from the UE. The UE data comprises self-location information (such as GPS coordinates of the UE or other alternative location identification information) and radio environment metrics at the time the UE experienced a coverage outage. The UE data may indicate, along with the self-location, the method used to self-locate (e.g., identify if the location data is based on GPS self-location, on trilateration self-location, or based on other methods).

It is noted that at least some of this information is not commonly available to the RAN because the UE may not be visible to the eNBs of the RAN (i.e., not in radio communication with the eNBs). Said in another way, at least some of this information is not traditionally available because there is no communication channel, at the time, to move this information from the UE to the eNBs. In some cases the radio environment may support the eNB being aware of the UE but not be sufficiently noise free to support granting a wireless link by the eNB to the UE. In other cases, however, the radio environment may be such that the eNB may be entirely unaware of the UE. In the second case, analyzing the data from the UE in the context of the RAN performance data (or the lack thereof) can provide new insights that can be leveraged to adapt the RAN. The adaptations may comprise adjusting operating parameters of eNBs, adjusting antenna tilts, and the like. The adaptations may comprise adapting continuing buildout of the RAN by the addition of new eNBs. Action may comprise adapting operating parameters of equipment items in one or more eNB.

The self-location information sourced by the UE can be considerably more accurate than the position of the UE estimated by eNBs. For example, the eNB may rely on trilateration position estimation techniques, and the UE may rely upon global positioning system (GPS) position estimation techniques or other self-location techniques (such as locating relative to Wi-Fi access points having known physical locations). Typically, GPS locating is much more accurate than trilateration position locating. As a result of this increased position accuracy, the data provided by the user installed applications on the UEs can provide precise location information associated with radio coverage outages, information that can help locate small pockets of radio coverage problems which might have previously eluded coarser grained analysis techniques. In an embodiment, UE data that comprises self-location information that is not based on GPS based self-locating may be discarded or not analyzed. Alternatively, the UE data having self-location information that is not based on GPS based self-locating techniques may be used but not for defining spatial boundaries of wireless coverage holes.

In some cases, the existence of UE sourced data to which no eNB sourced data corresponds can be analyzed and inferences made therefrom. For example, a plurality of UE sourced data having self-location data that is proximate to an eNB with no corresponding data may be used to map a coverage gap. In some cases the coverage gap may be very small and may be overlooked when analyzing only data sourced from eNBs, partly because the position data from eNBs may be too coarsely granulated to distinguish the boundaries of the coverage gap. The collection and management of sensor data and/or metrics from a very large number of UEs (for example, a single wireless service provider may provide wireless communication service to tens of millions of UEs) can be quite a challenge. Additionally, flowing this sensor data from the UEs to the analysis framework in a timely fashion without unduly burdening the wireless communication infrastructure is a challenge.

In other cases where both UE sourced data and corresponding eNB sourced data exists, there may be a significantly greater volume of eNB data versus the volume of UE data. In this later case, the UE sourced data may be weighted significantly more than the eNB sourced data to compensate for this volume discrepancy. The approach may comprise different but complementary techniques to combining the data. For example, data available from UEs associated with an eNB (e.g., located within the estimated coverage area of the eNB) may be compared with data from the eNB from restricted time periods that align with the time of the UE data. Said in another way, eNB data that does not align in time with the available UE data may be eliminated from analysis, which may help to balance the roles of UE data versus eNB data. This may have the effect of eliminating from consideration, at least for this approach to comparing the data from the two different sources, data from the eNB for which there is no corresponding UE data. An analysis technique which may be complementary may involve determining a ratio of UE data points to eNB data points for the subject time periods and weighting the UE data accordingly in the comparison and analysis. Thus, if there are 10,000 times as many eNB data points as UE data points, the UE data points may be given a relative weight of 10,000 versus a relative weight of 1 for the corresponding eNB data points.

The UE and eNB data may be analyzed across a RAN to determine statistical medians and averages that can be used to identify what are normal radio environments and distinguish them from abnormal radio environments that call for some remedial action. This information can be used to determine to make adjustments and even determine that a need for adjustments exists. This information can be used to categorize specific combinations of conditions that may result in a maladapted radio environment when that combination of conditions recurs, and this information can be used in future buildouts to improve the buildout design of the RAN.

Turning now to FIG. 1, a system 100 is described. In an embodiment, the system 100 comprises a user equipment (UE) 102, an enhanced node B (eNB) 104, and a network 106. The UE 102 may be a mobile phone, a smart phone, a personal digital assistant (PDA), a media player, a wearable computer, or a headset computer. The eNB 104 may be a base transceiver station (BTS) or a cell tower. While a single UE 102 and a single eNB 104 are depicted in FIG. 1, it is understood that the system 100 comprises a great many UEs 102 and a great many eNBs 104. For example, the system 100 may support tens of millions of UEs 102 and tens of thousands of eNBs 104. The network 106 comprises one or more public networks, one or more private networks, or a combination thereof.

The UE 102 and the eNB 104 communicate wirelessly in accordance with one or more of a long term evolution (LTE), a code division multiple access (CDMA), a global system for mobile communications (GSM), or a worldwide interoperability for microwave access (WiMAX) wireless communication protocol. It is understood that in some systems 100 multiple wireless communication technologies exist and operate side-by-side. Thus, some cell towers may support wireless communication based both on the LTE wireless protocol and of the CDMA wireless protocol, for example.

As illustrated in FIG. 1, the eNB 104 provides a wireless communication link to the UE 102. At other times, however, a different eNB may provide a wireless communication link to the UE 102, for example as the UE 102 moves from place to place. At yet other times, the UE 102 may be proximate to the eNB 104 but not receive a wireless communication link from the eNB 104, for example because the UE 102 is located in a coverage hole or a coverage outage region of the eNB 104.

A radio access network (RAN) may be composed of a plurality of eNBs 104 and supporting equipment items such as IP routers and IP aggregators. The eNBs 104 may be coupled to the network 106 by backhaul communication links such as fiber optic lines, coaxial lines, or other fixed communication resources. Some of the eNBs 104 may have their backhaul communication link to the network 106 provided by a donor eNB 104. For example, an eNB 104 may communicate with a donor eNB 104 via a microwave radio link, and the donor eNB 104 may relay that communication onto the network 106 via a fiber link from the donor eNB 104 to the network 106.

The eNBs 104 in the RAN may be providing a large volume of network data 112 that is stored in a data store 110 coupled to the network 106. The network data 112 comprises a variety of performance metrics and event logs created by the eNBs 104 and other equipment items in the RAN. This network data 112 is associated with calls—either voice calls or data calls—involving UEs 102 and supported by the eNBs 104. In some contexts the network data 112 may be referred to as call measurement data or call data and may be distinguished from equipment item parameter values and setting values. Data about the eNB and RAN equipment items themselves (current parameter settings, antenna signal strengths, power amplifier settings, and the like) may be stored separately from the network data 112. Different kinds of data or different amounts of data and/or different kinds of data may be provided by eNBs 104 depending on what wireless communication protocol(s) they support. For example an eNB 104 that supports LTE may provide different kinds of data as well as different amounts of data from an eNB 104 that supports CDMA.

The eNBs 104 may provide the network data 112 on a periodic basis, for example every fifteen minutes, every hour, every day, or on some other periodic basis. The eNBs 104 may push the network data 112 to the data store 110 or the data store 110 or another application may pull the data. For example a network operations center (NOC) tool may log into element management systems (EMSs) provided by equipment item vendors, access the desired information, and copy it into the network data 112 on the data store 110.

The UEs 102 may comprise a user installed application that captures UE data, for example a data capture application 108. It is understood that from the perspective of a user of the UE 102, the data capture application 108 may primarily deliver some functionality of interest to the user, such as restaurant selection assistance, weather alerts, and others. From the point of view of the present disclosure, the user application collects and periodically transmits data, and this behavior leads to its name in the context of this disclosure as the data capture application 108.

The data capture application 108 sends data about the UE 102 radio environment to be stored in a UE data 114 area of the data store 110. While the UE 102 is coupled to the RAN by the eNB 104, the UE 102 may transmit the collected data periodically, such as every fifteen minutes, every hour, or every day. When the UE 102 has experienced a coverage outage, it may be unable to transmit wirelessly but it may continue to record and log the radio environment that it is experiencing. When the UE 102 reconnects to the RAN, for example to the eNB 104, the UE 102 may transmit the collected UE data to the UE data 114 in the data store 110. The UE data 114 may be said to be collected at the data store 110, notwithstanding it being the data capture application 108 and the UE 102 that push the data periodically to the data store 110, in that this UE data is aggregated and stored there at the data store 110.

In an embodiment, the data capture application 108 may transmit the UE data 114 as soon as it reconnects with the eNB 104, notwithstanding a periodic schedule. For example, the UE 102 may be more or less continuously connected to the eNB 104 and transmits its data to the UE data 114 on the data store 110 via the eNB 104 every fifteen minutes. If the UE 102 experiences a transient coverage outage, for example 5 minutes after a previous periodic report, when the UE 102 reestablishes a wireless link with the eNB 104, the data capture application 108 may immediately send data related to the transient coverage outage to the UE data 114 on the data store 110 even though this is not on the periodic data transfer schedule for that UE 102.

The system 100 further comprises a computer system 116 that executes an analysis application 118. The analysis application 118 may read the network data 112 and the UE data 114 from the data store 110 and analyze this information to determine how to adapt the system 100 to better support wireless communication service for the UE 102, for example to adapt the RAN comprising the eNB 104 and other eNBs.

It is contemplated that the analysis application 118 may perform a number of separate or independent analyses of the network data 112 and the UE data 114. It is also contemplated that the analysis application 118 may combine or correlate the independent analyses in yet another analysis technique or method.

The analysis application 118 may select data from the UE data 114 that comprises reports from UEs 102 that have lost wireless coverage from the eNB 104. It is observed that the network data 112 may not comprise corresponding data for these reports, because the UEs 102 were detached from the RAN and were not in communication with any eNB 104. It is understood that the data capture application 108 does not report radio outage conditions caused or driven by operating modes of the UE 102 that are selected by the user. For example, the data capture application 108 may not report radio outage when the user has deliberately turned off the radios of the UE 102 or has powered off the UE or has entered into an airplane mode of operation. Alternatively, the data capture application 108 may report on operational mode transitions of the UE 102 that may interrupt radio connectivity to the RAN, information that may be useful for other analyses and other purposes.

The analysis application 118 may select the UE data 114 that describes or relates to radio coverage outages experienced by the UEs 102. It may group or process these reports based on the self-location of the UEs 102. The analysis application 118 may attempt to fit the data to a variety of different potential patterns. Do a plurality of outage reports comprise self-location information that places them in the presumed coverage area of a particular eNB 104 or a small group of eNBs 104? The identification of more than a threshold number of outage reports associated with a single coverage area of a particular eNB 104 of small group of eNBs 104 may generate an event that causes a notification to be sent to a RAN monitoring operator and/or to a network operations center (NOC) tool. The event may cause a trouble ticket to be opened identifying the UEs 102 and the eNB(s) 104 associated with the area of radio coverage outage. This may lead to adaptation of the radio operating parameters of the eNB 104 or to the addition of a new eNB 104 in the area proximate to the eNB 104. This scenario may correspond to a radio coverage hole model or pattern. Other patterns may be defined and compared by the analysis application 118 in seeking to interpret and to take action based on the combination of UE data 114 and the network data 112.

In an embodiment, the analysis application 118 may first determine if the eNB 104 recorded a radio down event that aligns in time with the outage experienced by the UEs 102. In the case that an eNB 104 radio down situation is known to have occurred it may be assumed to be the reason that the UE 102 experienced a radio coverage outage, and the analysis application 118 may then discard that UE data 114.

The analysis application 118 may build over time an abstract map or define a contiguous region of radio coverage outage based on analysis of UE data 114. The analysis application 118 can use the self-location information contained in the UE data 114. In an embodiment, the analysis application 118 may construct the contiguous region of radio coverage outage using only self-location information form UEs 102 that is based on GPS coordinates and without using less accurate self-location information, for example without using any trilateration based self-location information. This may be done to increase the accuracy of the definition of the region of radio coverage outage. Having defined a contiguous region of radio coverage outage, the operating parameters of proximate eNBs 104 may be adapted accordingly.

For example, antenna tilts may be adjusted, antenna beams may be steered algorithmically to adapt the coverage area, power amplifier gains may be increased or decreased.

A tower crew may be dispatched to inspect the eNB(s) 104 in person. A visual, first hand inspection may reveal conditions that may not be automatically determined. For example, an antenna may be observed to have been knocked out of alignment by a recent storm. A construction project may have erected a steel structure that interferes with the line-of-sight radio links of the eNB(s) 104. This first hand inspection may reveal other courses of action to remediate the observed radio coverage outage.

In an embodiment, the analysis application 118 may perform statistical analysis of the UE data 114 to determine norms and averages. The analysis application 118, for example, may determine an average rate of experienced wireless coverage outage. These norms and averages may be used to set thresholds for adapting eNB 104 parameters or for taking other actions. The analysis application 118 may determine a single norm across all the eNBs of the RAN. The analysis application 118 may determine different norms and averages for different sets of eNBs. For example, the analysis application 118 may determine different norms for different regional areas or for different metropolitan areas— such as a first norm for the Dallas-Fort Worth area and a second norm for the Denver Metropolitan area. The analysis application 118 may determine different norms for different categories of radio environment, for example different norms for each of a suburban radio environment, an urban radio environment, a skyscraper radio environment, and a rural radio environment.

The statistics may take into consideration the make and model of the UE 102 that generates the UE data 114. The analysis application 118 may determine that a specific UE model is associated with increased radio coverage outage experiences (poorly designed antenna, lossy radio frequency input and/or output stage, or other hardware shortcomings of a UE model may be at fault).

The analysis application 118 may be able to derive buildout rules from the statistical analysis. For example, the analysis application 118 may determine that specific local radio environment conditions experience an increased incidence of radio coverage outages and generate a recommended buildout rule based on that determination. For example, the analysis application 118 may recommend building the tower structure 30% higher or locating eNBs 104 30% more densely per unit area, when the subject radio environment conditions are present. The radio environment conditions could be defined as a category or class of environment. This could involve the presence of large buildings, the irregularity of terrain, the amount of leafy foliage.

The analysis application 118 may further perform an analysis that uses both UE data 114 and network data 112. This can be thought of as monitoring the RAN from two different views—from the view seen by eNBs 104 and from the view seen by UEs 102. It is understood that the analysis application 118 may selectively focus on discrepancies between the network data 112 and corresponding UE data 114. Said in another way, the analysis application 118—or a different application—may analyze the great wealth of network data 112 harvested from the eNBs 104 independently of the UE data 114 to monitor and visualize the operational state of the RAN and the eNBs 104. The teachings herein, however, focus on combining the network data 112 and the UE data 114 to glean new insights that the analysis of network data 112 alone may not reveal.

The analysis of UE data 114 in combination with the network data 112 may select data from the network data 112 that corresponds to types of data that is present in the UE data 114. The volume of UE data 114 associated with network data 112 associated with a specific eNB 104 may be much scarcer than the selected network data 112 associated with the same eNB 104. The analysis application 118 may try to limit the volume of network data 112 further, for example by selecting data from a narrow time window that corresponds to the time of the UE data 114 reports. Finally, the analysis application 118 may determine a ratio of UE data 114 to selected network data 112 and weight the UE data 114 accordingly. For example, if five times as many reports remain from the network data 112 than from corresponding UE data 114, the UE data 114 may be weighted five times as heavily as the remaining network data 112.

In some cases, the comparison between the eNB 104 view of the RAN and the UE 102 view of the RAN may be at odds with each other. For example, the eNB 104 may deem a UE 102 to be located proximate to that eNB 104 and hence in its coverage area, while the UE 102 self-location indicates that it is in fact located relatively distantly from that eNB 104 and closer to a different eNB 104. This discrepancy may result from the inaccuracy of trilateration position estimation used by eNBs 104 versus the greater accuracy of GPS self-location that may be employed by UEs 102. The determination of this discrepancy can be employed by the analysis application 118 to adapt the subject eNB 104. In an embodiment, the analysis application 118 may invoke an API of a different system or application executing on a different computer platform to enact the adaptations of eNBs 104.

Figure 2:
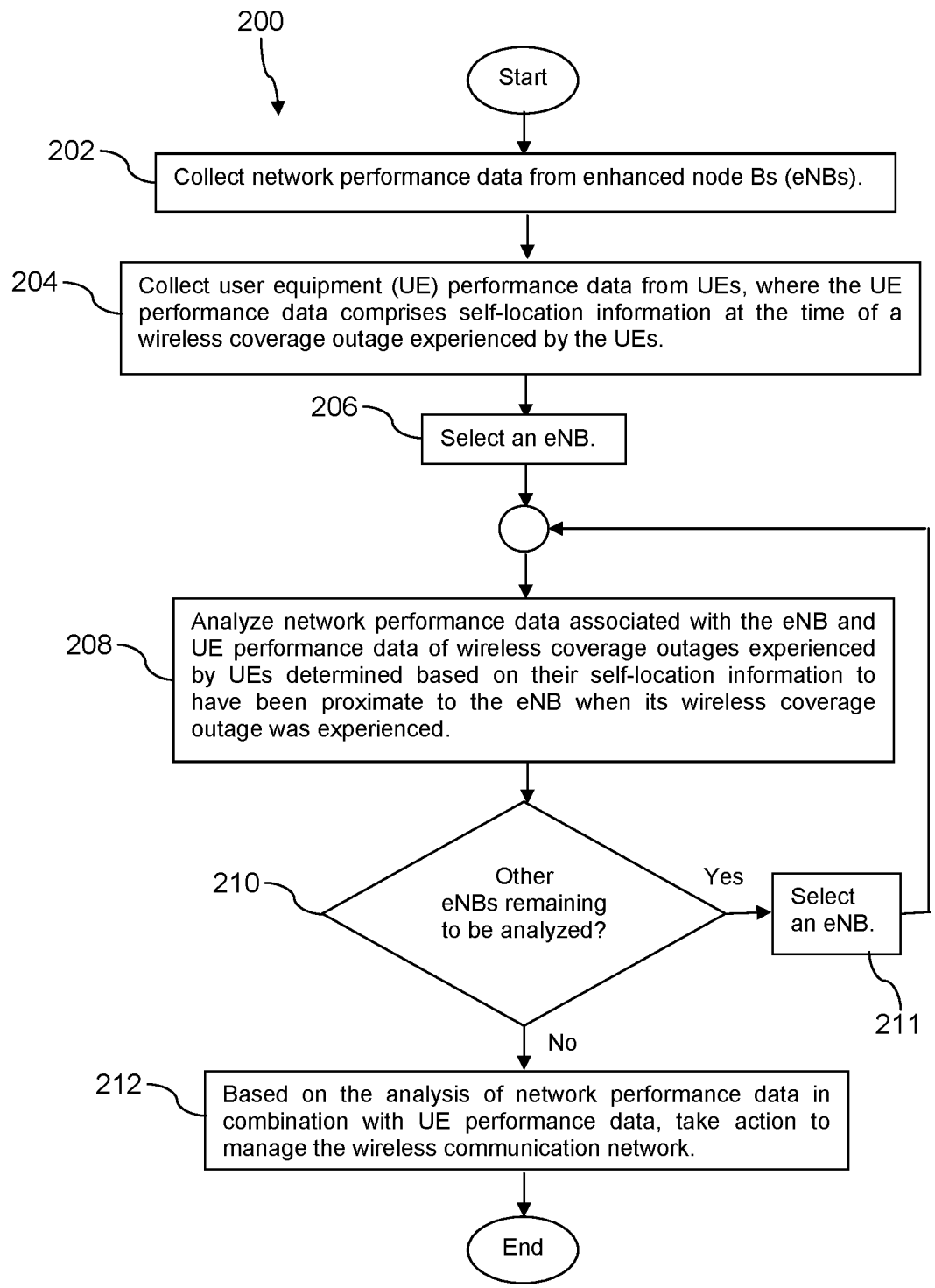
FIG. 2 is a flow chart of a method according to an embodiment of the disclosure.

Turning now to FIG. 2, a method 200 is described. At block 202, network performance data is collected from enhanced node Bs (eNBs). The performance data comprises data about UE 102 calls and UE 102 interactions with the eNBs. For example, an application executing on a computer system (e.g., analysis application 118 executing on computer system 116) logs into element management systems (EMSs) of different vendor equipment installed in the eNBs 104 and pulls current information from the eNBs 104 and stores it in the network data 112 in the data store 110. This block of processing may be performed periodically, for example every fifteen minutes, every hour, or on some other periodic basis. Alternatively, the eNBs 104 push data to the data store 110 to be collected as network data 112. However the data related to calls (both voice calls and data calls) of UEs 102 that is generated by the eNBs 104 get to the data store 110, the network data 112 may be said to collect this eNB generated data in that it organizes and aggregates this data in a searchable, regular data structure and the analysis application 118 may equally be said to collect the network performance data from the eNBs in that the analysis application 118 retrieves the network data 112 from the data store 110. In an embodiment, at least some of the performance data is generated by sensors in the eNBs.

At block 204, user equipment (UE) performance data is collected. The UE performance data comprises self-location information at the time of a wireless coverage outage experienced by the UEs. In an embodiment, the self-location information identifies a self-location technique that was used, for example GPS self-location technique or trilateration self-location technique or another self-location technique. The UE performance data may further comprise identities of eNBs 104 proximate to the UE, for example eNBs whose radio transmissions the UE 102 may receive at the time of the record or log. The UE performance data may further comprise data about calls (both voice calls and data calls) that were successfully completed via the eNB 104. The UE performance data also comprises an indication of time. The UE performance data may take the form of a plurality of reports or log entries from each different UE 102. The UE performance data may further comprise data about radio environment conditions experienced by the UE 102 while not experiencing a wireless coverage outage and while receiving nominally operative wireless coverage. In an embodiment, at least some of the UE performance data is generated by sensors in the eNBs.

The UE performance data may be pushed to the UE data 114 in the data store 110 by the UEs 102. The UEs 102 may push the UE performance data periodically, for example every fifteen minutes, every hour, every day, or some other periodic interval. The different UEs 102 may not send at the same times but may randomly skew their data push activity to avoid overloading the data store 110 processing. In some cases, some of the UEs 102 may push UE data aperiodically to the UE data 114, for example on the event of exiting a radio coverage outage situation. However the data generated by UEs 102 (i.e., by the data capture application 108) gets to the data store 110, the UE data 114 may be said to collect this data in that it organizes and aggregates this UE generated data in a searchable, regular data structure. The analysis application 118 may be said to collect the UE performance data from the UEs in that it retrieves the UE data 114 from the data store 110.

At block 206 one of a plurality of eNBs 104 of the RAN is selected as a basis for analyzing data. It is understood that the RAN of a given wireless communication service provider may include tens of thousands of eNBs or cell towers. The analysis application 118 executing on the computer system 116 may perform the processing of block 206. At block 208, network performance data associated with the eNB is analyzed in combination with UE performance data of wireless coverage outages experienced by UEs determined based on their self-location information to have been proximate to the eNB when its wireless coverage outage was experienced. Said in another way, UE performance data of wireless outages experienced in the proximity to the subject eNB are analyzed. It is understood that in addition to the information or data related to the wireless coverage outage, other data related to the UE may also be analyzed. The analysis may take into account the age of the UE and the model of the UE. The analysis application 118 executing on the computer system 116 may perform the processing of block 208.

At block 210, if the data associated with other eNBs 104 in the RAN remains to be analyzed, processing passes to block 211 where another eNB 104 is selected. Processing returns to block 208. By iterating through blocks 208, 210, and 211, the network data 112 and the 114 UE data are processed and analyzed, one eNB at a time. It is understood that the analysis of block 208 is performed from the view point of the subject eNB 104. That is, network data 112 associated with that eNB 104 is analyzed in combination with UE data 114 that has self-location information placing the associated UE proximate to the subject eNB 104 (e.g., in the presumed coverage area of the subject eNB). At block 210, if all the eNBs have been analyzed, processing proceeds to block 212.

At block 212, based on the analysis of network performance data in combination with UE performance data, action is taken to manage the wireless communication network. The analysis application 118 executing on the computer system 116 may be involved in taking action to manage the wireless communication network at least in so far as it may raise a flag or send a notification to take an action. In some cases, the analysis application 118 directly initiates action. The action taken may comprise automatically adapting settings of equipment items in the eNB 104. The analysis application 118 may perform this adapting or reconfiguration of equipment item settings in the eNB 104 or it may invoke an API of a NOC tool or of an element management system (EMS) to cause the equipment item settings to be changed.

The action taken may comprise identifying that a radio access network (RAN) buildout is incomplete in an area (e.g., in an area where the wireless coverage outage occurred) and constructing or scheduling construction of at least one new eNB to complete the buildout. As was described above, RANs are complex systems. Buildout of new generations of RAN equipment items may be conducted at different times in different areas. Sometime initial buildout plans are changed on the fly and hence anomalies in buildout may occur.

The action taken may comprise dispatching a crew to an eNB site to visually inspect the eNB. The crew may notice conditions at the eNB site that are not remotely monitored. For example, a storm may have caused some damage to the eNB equipment that is not identifiable remotely. New construction on an adjacent site may be interfering with line-of-sight radio communications. The crew may make some repair of readjustment while on site of the eNB. Alternatively the crew may report back to maintenance a condition to be remedied.

Figure 3:
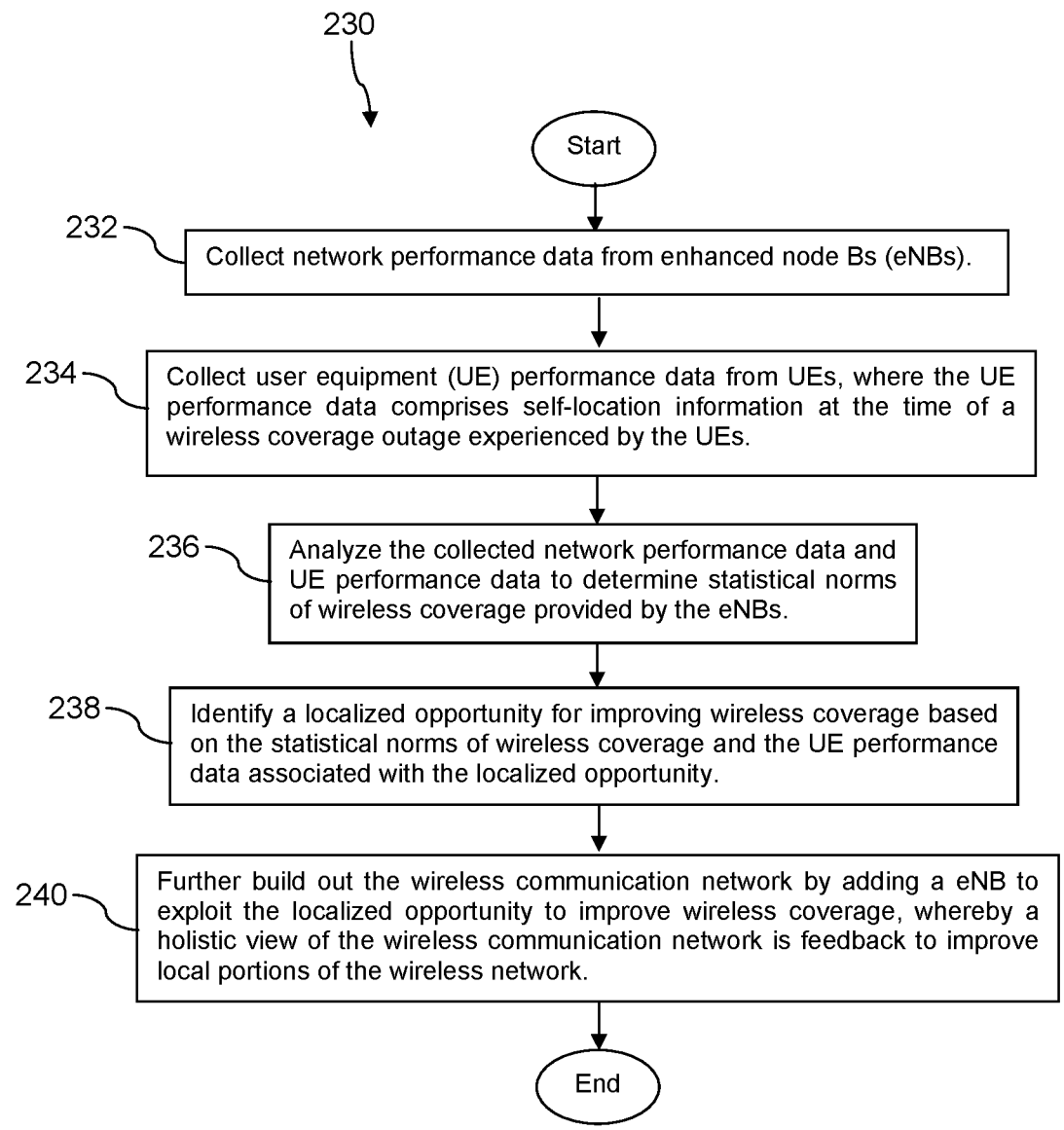
FIG. 3 is a flow chart of another method according to an embodiment of the disclosure.

Turning now to FIG. 3, a method 230 is described. At block 232, network performance data is collected from enhanced node Bs (eNBs). The analysis application 118 executing on the computer system 116 may perform the processing of block 232. At block 234, user equipment (UE) performance data from UEs is collected, where the UE performance data comprises self-location information at the time of a wireless coverage outage experienced by the UEs. It is understood that collecting UE performance data comprises consolidating UE data 114 in the data store 110. The UEs 102 may push the UE data to the UE data 114 in the data store 110 periodically or on events, as described further above. The analysis application 118 executing on the computer system 116 may be considered perform at least part of the processing of block 234 because it may access the UE data 114 stored in the data store 110. At block 236, the collected network performance data and UE performance data is analyzed to determine statistical norms of wireless coverage provided by the eNBs. The analysis application 118 executing on the computer system 116 may perform the processing of block 236.

At block 238, a localized opportunity for improving wireless coverage is identified based on the statistical norms of wireless coverage and the UE performance data associated with the localized opportunity. The analysis application 118 executing on the computer system 116 may perform the processing of block 238. At block 240, the wireless communication network is built-out further by adding an eNB to exploit the localized opportunity to improve wireless coverage, whereby a holistic view of the wireless communication network is feedback to improve local portions of the wireless network. The analysis application 118 executing on the computer system 116 may be said to initiate the processing of block 240.

Figure 4A:
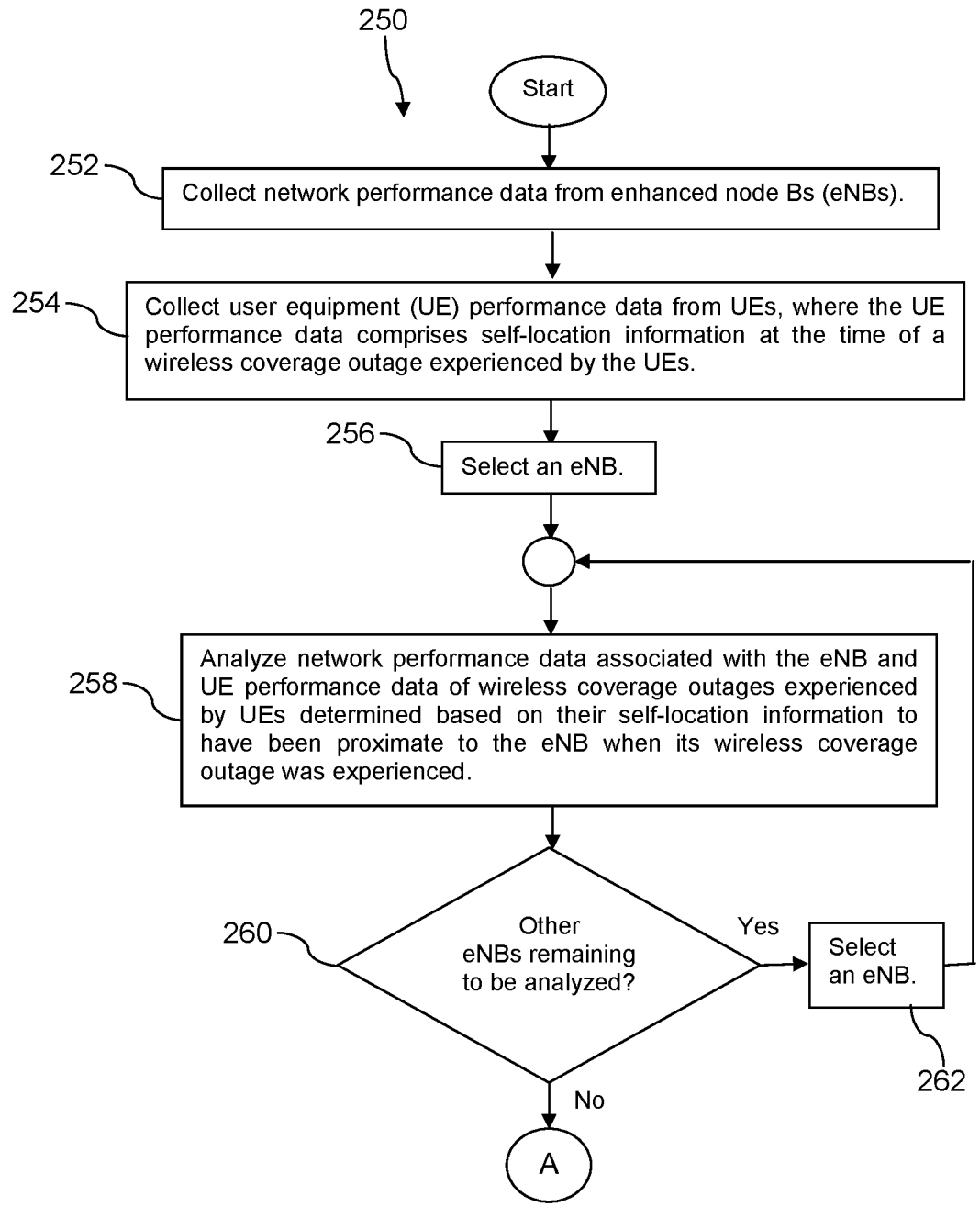
FIG. 4A and FIG. 4B are a flow chart of yet another method according to an embodiment of the disclosure.
Figure 4B:
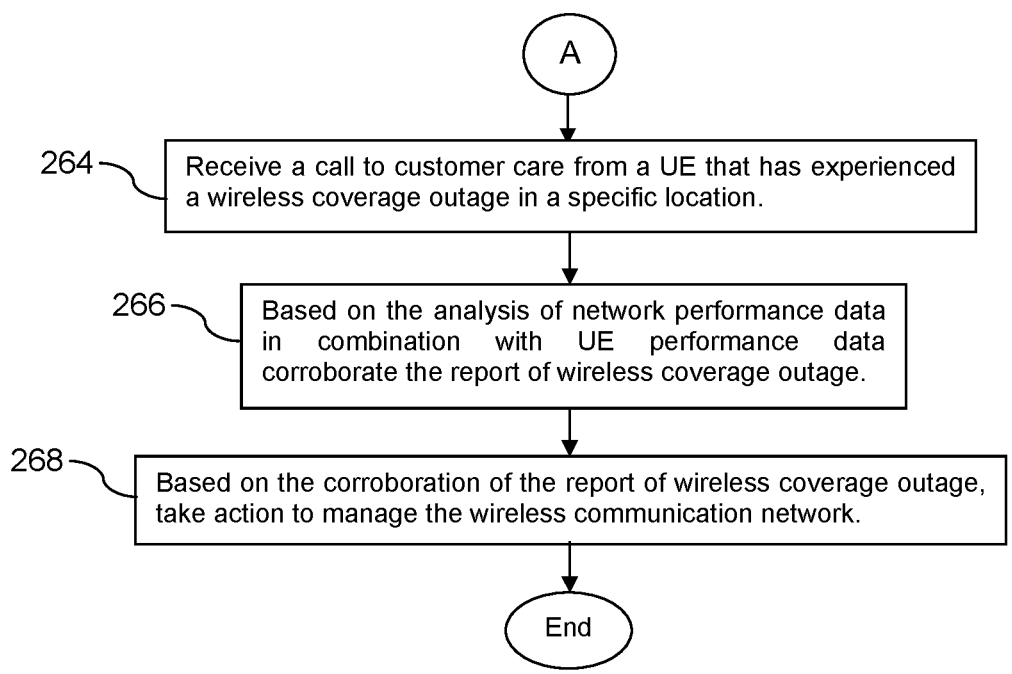

Turning now to FIG. 4A and FIG. 4B, a method 250 is described. At block 252, network performance data is collected from enhanced node Bs (eNBs). The analysis application 118 executing on the computer system 116 may perform the processing of block 252. At block 254, user equipment (UE) performance data is collected from UEs, where the UE performance data comprises self-location information at the time of a wireless coverage outage experienced by the UEs. It is understood that collecting UE performance data may comprise organizing the UE data 114 in the data store 110. The data capture application 108 may capture the UE performance data and periodically or on even push the UE performance data to the data store 110 where that UE performance data may be collected. The analysis application 118 executing on the computer system 116 may be said to perform the processing of block 254 in that the application 118 reads the UE data 114 from the data store 110.

At block 256, an eNB is selected. At block 258, the network performance data associated with the eNB and UE performance data of wireless coverage outages experienced by UEs determined based on their self-location information to have been proximate to the eNB when its wireless coverage outage was experienced is analyzed. The analysis application 118 executing on the computer system 116 may perform the processing of block 258. At block 260, if other network data associated with other eNBs remains to be processed, the processing passes to block 262 where another eNB is selected. Then the processing returns to block 258. By iteratively cycling through blocks 258, 260, and 262 the network data 112 and the UE data 114 is analyzed on a eNB-by-eNB basis. Said in another way, the processing of blocks 258, 260, and 262 develops an eNB-centric view of RAN behavior, albeit it brings the perspective of UE experiences of radio coverage holes to the analysis for the subject eNB. At block 260, if no other eNBs remain to be analyzed, processing passes on to block 264.

At block 264, receive a call to customer care from a UE that has experienced a wireless coverage outage in a specific location. At block 266, based on the analysis of network performance data in combination with UE performance data corroborate the report of wireless coverage outage. At block 268, based on the corroboration of the report of wireless coverage outage, take action to manage the wireless communication network. The actions taken may be any of those described above, for example adding a new eNB to complete a buildout in the area, adapting eNB operating parameters, and the like.

In some cases, the processing at block 266 may result in not corroborating the experience reported by the call to customer care. Said in another way, the processing at block 266 may not find evidence of other UEs experiencing wireless coverage outages where the UE of the call to customer care has experienced a wireless coverage outage. The action, in this case, may comprise informing the caller to customer care that the UE model he or she is using is known to experience wireless coverage outages due to substandard radio components built into the UE model, for example underperforming antenna or lossy radio signal receive or transmit channel. Alternatively, the customer care agent may explain various conditions that can interfere with radio coverage, such as calls attempted while in an elevator.

Figure 5:
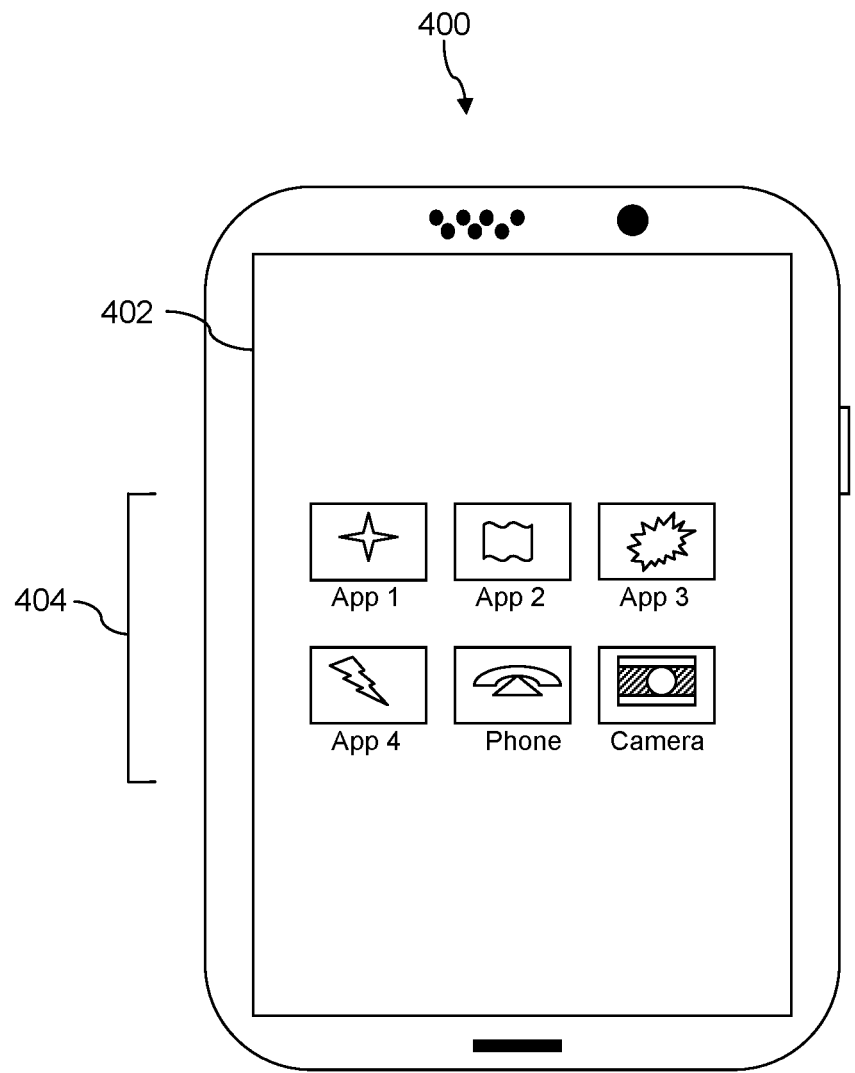
FIG. 5 is an illustration of a handset according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The data capture application 108 described above with reference to FIG. 1 may be such a user downloaded and installed application. Again, as remarked upon above, the user may consider the application to have some other function of interest to the user—a gaming function, a restaurant finding function, a social networking function, a weather alerts function—notwithstanding that the function it provides with reference to the present disclosure is capturing and reporting on a radio environment of the UE 400 back to the data store 110.

The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
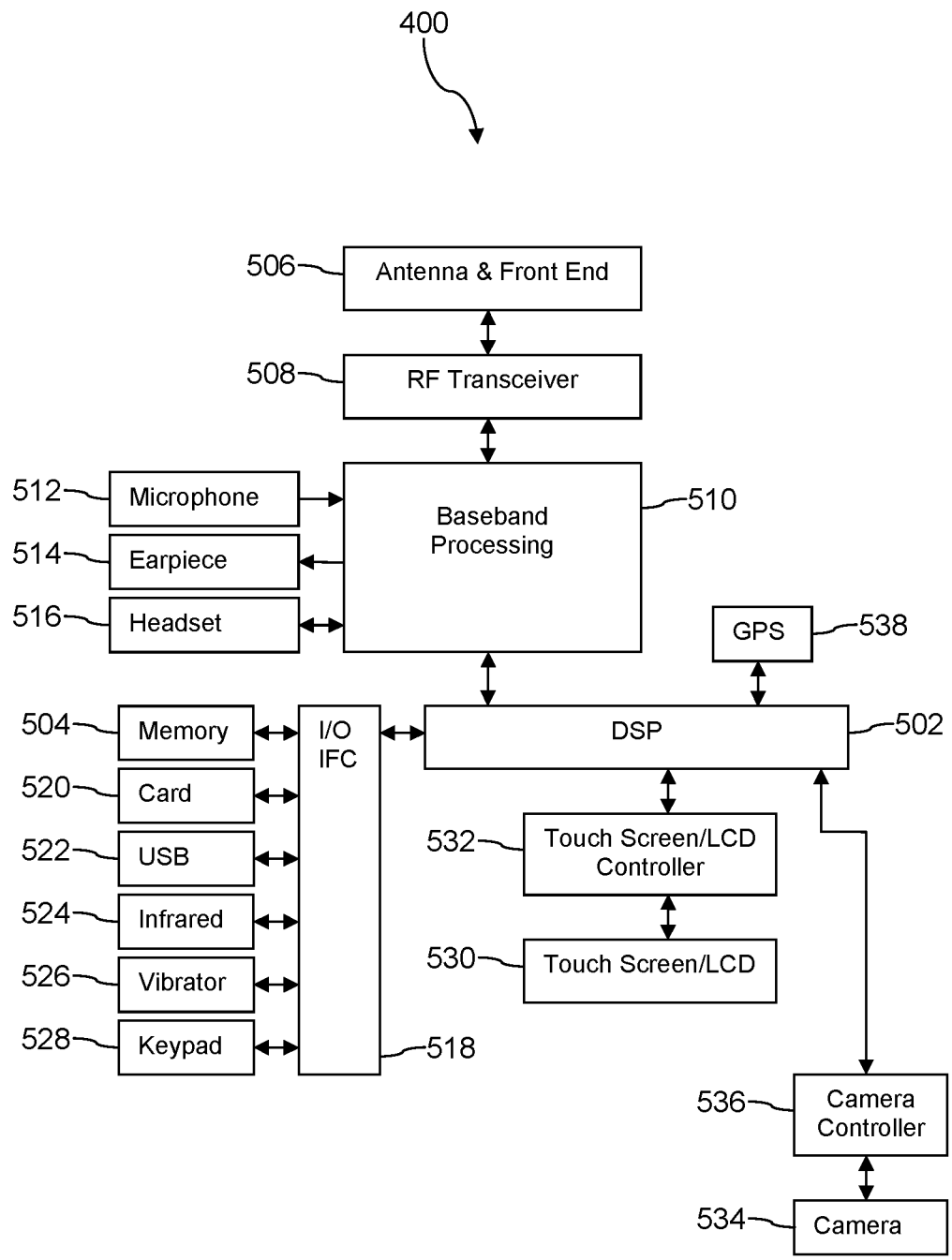
FIG. 6 is a block diagram of a hardware architecture of a handset according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
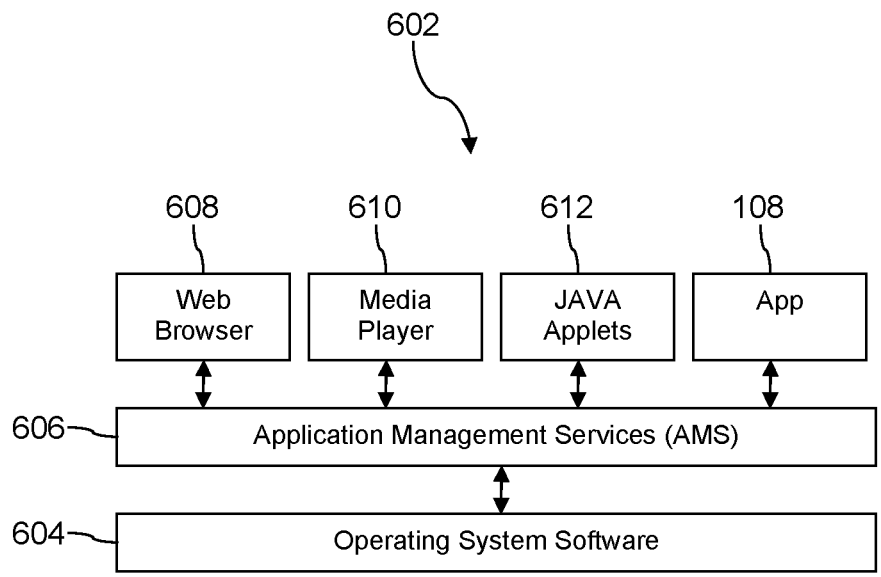
FIG. 7A is a block diagram of a software architecture of a handset according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. The data capture application 108 may execute on top of the AMS 606.

The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
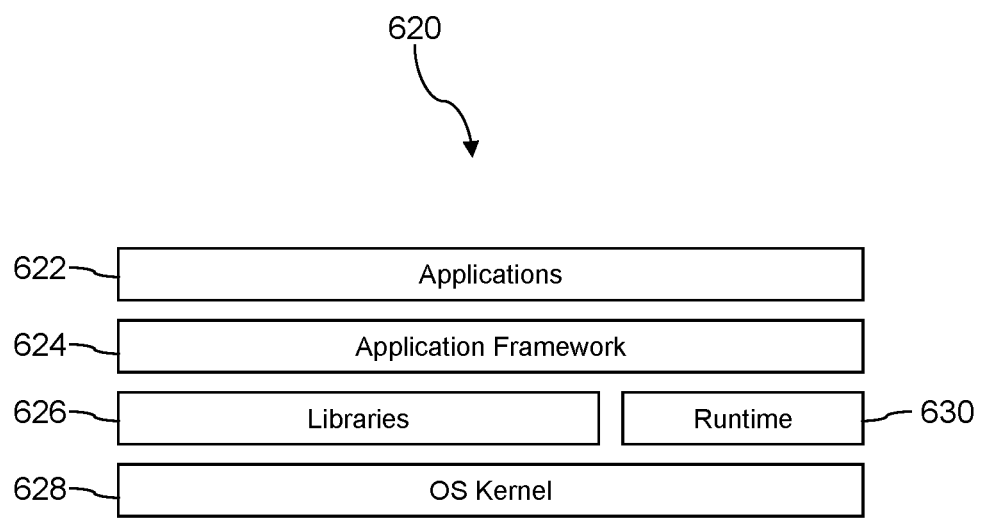
FIG. 7B is a block diagram of another software architecture of a handset according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
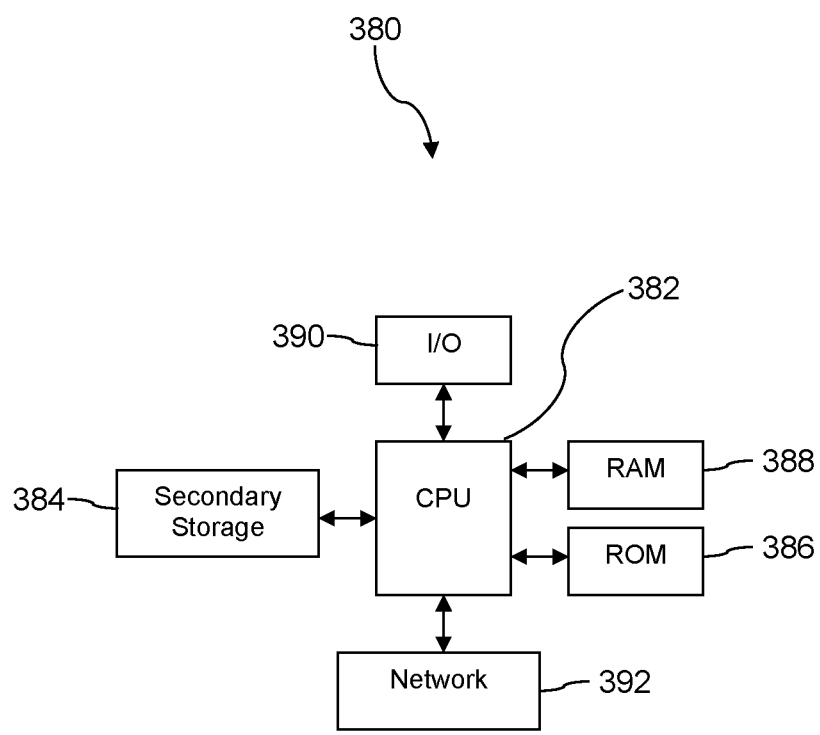
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embedded in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of managing a wireless communication network, comprising:
    collecting network performance data from enhanced node Bs (eNBs) by an application executing on a computer system;
    collecting user equipment (UE) performance data from UEs, where the UE performance data comprises self-location information at the time of a wireless coverage outage experienced by the UEs;
    processing the network performance data from the eNBs and the UE performance data from the UEs to normalize an amount of the UE performance data from the UEs to an amount of the network performance data from the eNBs;
    for each eNB, analyzing by the application network performance data associated with the eNB and UE performance data of wireless coverage outages experienced by UEs determined based on their self-location information to have been proximate to the eNB when its wireless coverage outage was experienced; and
    based on the analysis of network performance data in combination with UE performance data, taking action by the application to manage the wireless communication network.

2. The method of claim 1, wherein taking action comprises automatically adapting settings of equipment items in an eNB.

3. The method of claim 1, wherein taking action comprises identifying that a radio access network (RAN) buildout is incomplete in an area and constructing at least one new eNB to complete the buildout in the area.

4. The method of claim 1, wherein taking action comprises dispatching a crew to an eNB site to visually inspect the eNB and the eNB site.

5. The method of claim 1, wherein collecting UE performance data comprises receiving data sent by data capture applications that execute on the UEs.

6. The method of claim 1, wherein at least some of the network performance data from eNBs is generated by sensors in the eNBs.

7. The method of claim 1, wherein the eNBs provide wireless communication coupling according to at least one of a long term evolution (LTE), a code division multiple access (CDMA), a global system for mobile communications (GSM), or a worldwide interoperability for microwave access (WiMAX) wireless communication protocol.

8. A method of managing a wireless communication network, comprising:
    collecting network performance data from enhanced node Bs (eNBs) by an application executing on a computer system;
    collecting user equipment (UE) performance data from UEs, where the UE performance data comprises self-location information at the time of a wireless coverage outage experienced by the UEs;
    processing the network performance data from the eNBs and the UE performance data from the UEs to normalize an amount of the UE performance data from the UEs to an amount of the network performance data from the eNBs;
    analyzing by the application the collected network performance data and UE performance data to determine statistical norms of wireless coverage provided by the eNBs;
    identifying by the application a localized opportunity for improving wireless coverage based on the statistical norms of wireless coverage and the UE performance data associated with the localized opportunity; and
    further building out the wireless communication network by adding an eNB to exploit the localized opportunity to improve wireless coverage, whereby a holistic view of the wireless communication network is fed back to improve local portions of the wireless network.

9. The method of claim 8, wherein determining statistical norms comprises determining an average rate of experienced wireless coverage outage across a plurality of eNBs and wherein identifying the localized opportunity for improving wireless coverage based on the statistical norms comprises identifying an eNB associated with an above average rate of wireless coverage outage experienced by UEs in a coverage area of the eNB.

10. The method of claim 9, wherein the statistical norm is determined across an entire radio access network (RAN).

11. The method of claim 9, wherein a statistical norm is determined across a metropolitan area.

12. The method of claim 8, wherein a different statistical norm is determined across each of a plurality of different radio environment categories.

13. The method of claim 12, wherein the radio environment categories comprise a suburban radio environment category, an urban radio environment category, a skyscraper radio environment category, and a rural radio environment category.

14. The method of claim 8, wherein network performance data that does not align in time with time of the UE performance data is eliminated from analyzing.

15. The method of claim 14, wherein UE performance data that does not include GPS based self-location information is eliminated from analyzing.

16. A method of managing a wireless communication network, comprising:
   collecting network performance data from enhanced node Bs (eNBs) by an application executing on a computer system;
   collecting user equipment (UE) performance data from UEs, where the UE performance data comprises self-location information at the time of a wireless coverage outage experienced by the UEs;
   processing the network performance data from the eNBs and the UE performance data from the UEs to normalize an amount of the UE performance data from the UEs to an amount of the network performance data from the eNBs;
   for each eNB, analyzing by the application network performance data associated with the eNB and UE performance data of wireless coverage outages experienced by UEs determined based on their self-location information to have been proximate to the eNB when its wireless coverage outage was experienced;
   receiving a call to customer care from a UE that has experienced a wireless coverage outage in a specific location;
   based on the analysis of network performance data in combination with UE performance data corroborating the report of wireless coverage outage; and
   based on the corroboration of the report of wireless coverage outage, taking action to manage the wireless communication network.

17. The method of claim 16, wherein taking action to manage the wireless communication network comprises informing the call to customer care that the UE model is known to experience wireless coverage outages due to substandard radio components build into the UE model.

18. The method of claim 16, wherein taking action to manage the wireless communication network comprises determining to add a new eNB in the area where the UE that called customer care experienced the wireless coverage outage.

19. The method of claim 16, further comprising:
   receiving a second call to customer care from a second UE that has experienced a wireless coverage outage in a second specific location;
   based on the analysis of network performance data in combination with UE performance data corroborating the report by the second UE of wireless coverage outage; and
   providing an explanation to the second customer care call of conditions that impede UEs receiving wireless coverage.

20. The method of claim 16, wherein at least some of the UE performance data is generated by sensors on the UEs.

* * * * *